United States Patent [19]

Marron

[11] Patent Number: 4,775,947
[45] Date of Patent: Oct. 4, 1988

[54] METHOD OF PROVIDING A VISUAL REPRESENTATION OF THE RUNOUT OF A SHAFT

[75] Inventor: Gerald I. Marron, Springfield, Pa.

[73] Assignee: Westinghouse Electric Corp., Pittsburgh, Pa.

[21] Appl. No.: 875,157

[22] Filed: Jun. 17, 1986

[51] Int. Cl.⁴ .................... G06F 11/30; G01B 7/28
[52] U.S. Cl. ........................................ 364/550; 33/550
[58] Field of Search ............... 364/550, 474, 184, 560; 33/550, 657, 203.16, 203.19, 169 C, 172 D, 336, 228, 288; 356/385, 386; 250/560, 561, 231 SE

[56] References Cited

U.S. PATENT DOCUMENTS

| 4,138,825 | 2/1979 | Pelta ............................... 33/228 |
| 4,180,915 | 1/1980 | Lill et al. ........................ 33/336 |
| 4,662,074 | 5/1987 | Knapp et al. ................. 33/169 C |

Primary Examiner—Parshotam S. Lall
Assistant Examiner—David C. Goldman
Attorney, Agent, or Firm—Fred J. Baehr, Jr.

[57] ABSTRACT

A method of determining the runout of a shaft which includes combining the signals from two linear variable differential transformers and a resolver in a computer to provide a visual or machine readable representation of the deviation of the outer peripheral portion of a shaft from that of a true cylindrical portion.

2 Claims, 3 Drawing Sheets

METHOD OF PROVIDING A VISUAL REPRESENTATION OF THE RUNOUT OF A SHAFT

BACKGROUND OF THE INVENTION

This invention relates to a method of providing a visual representation of the runout of a shaft and more particularly to a method of presenting a visual representation of the runout of the shaft forming the rotor of a steam turbine.

Shaft runout or the deviation of the outer periphery of the shaft from a true circle as the shaft is rotated has been found utilizing a dial indicator which is fixed next to a rotating shaft and has a point which contacts the shaft as the shaft rotates, the point follows the peripheral surface and a needle moves on a calibrated dial face to indicate the deviation of the peripheral surface with respect to a true circle. While this method is simple and accurate, reading a dial is difficult if the shaft is rotating and the operator must record the data relative to some angular position of the shaft or only the maximum runout can be recorded.

SUMMARY OF THE INVENTION

In general, a method of providing intelligible representation of the runout of a portion of a shaft when made in accordance with this invention, comprises the steps of supporting the shaft so that it rotates about its central axis, rotating the shaft about its central axis, contacting a portion of the shaft with a probe which produces a signal proportional to the deviation of the shaft respect to a true circle, utilizing a resolver to provide a signal indicative of the angular position of the shaft with respect to some reference thereon, using a probe to produce a signal indicative of the axial position of the first mentioned probe relative to an axial reference and combining the informational content of these signals to form an intelligible representation of the runout of the outer periphery of the shaft with respect to a true circle.

BRIEF DESCRIPTION OF THE DRAWINGS

The objects and advantages of this invention will become more apparent by reading the following detailed description in conjunction with the drawings, in which.

DESCRIPTION OF THE PREFERRED EMBODIMENT

Figure 1:
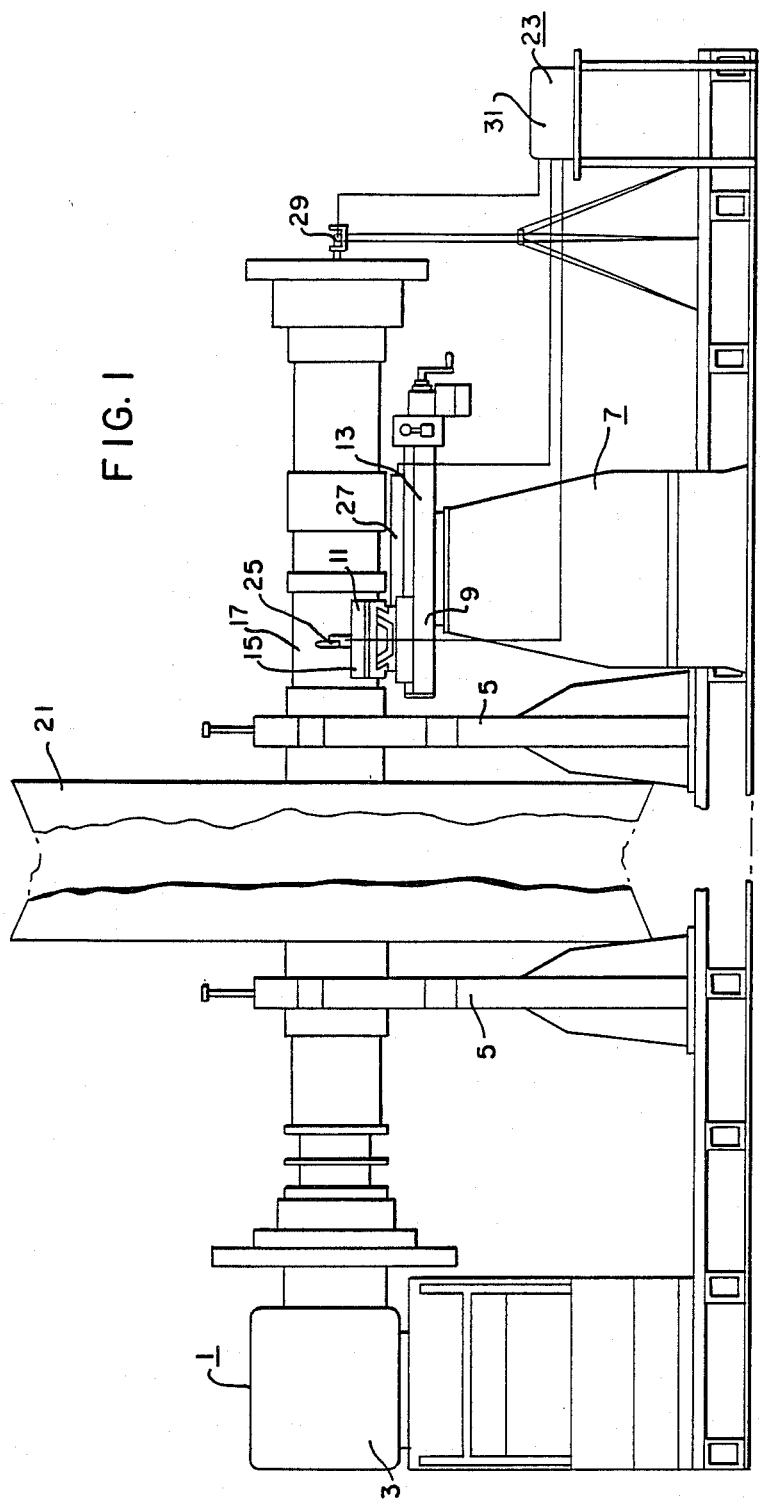
FIG. 1 is an elevational view of apparatus utilized to provide an intelligible representation of the runout of a large shaft.
Figure 2:
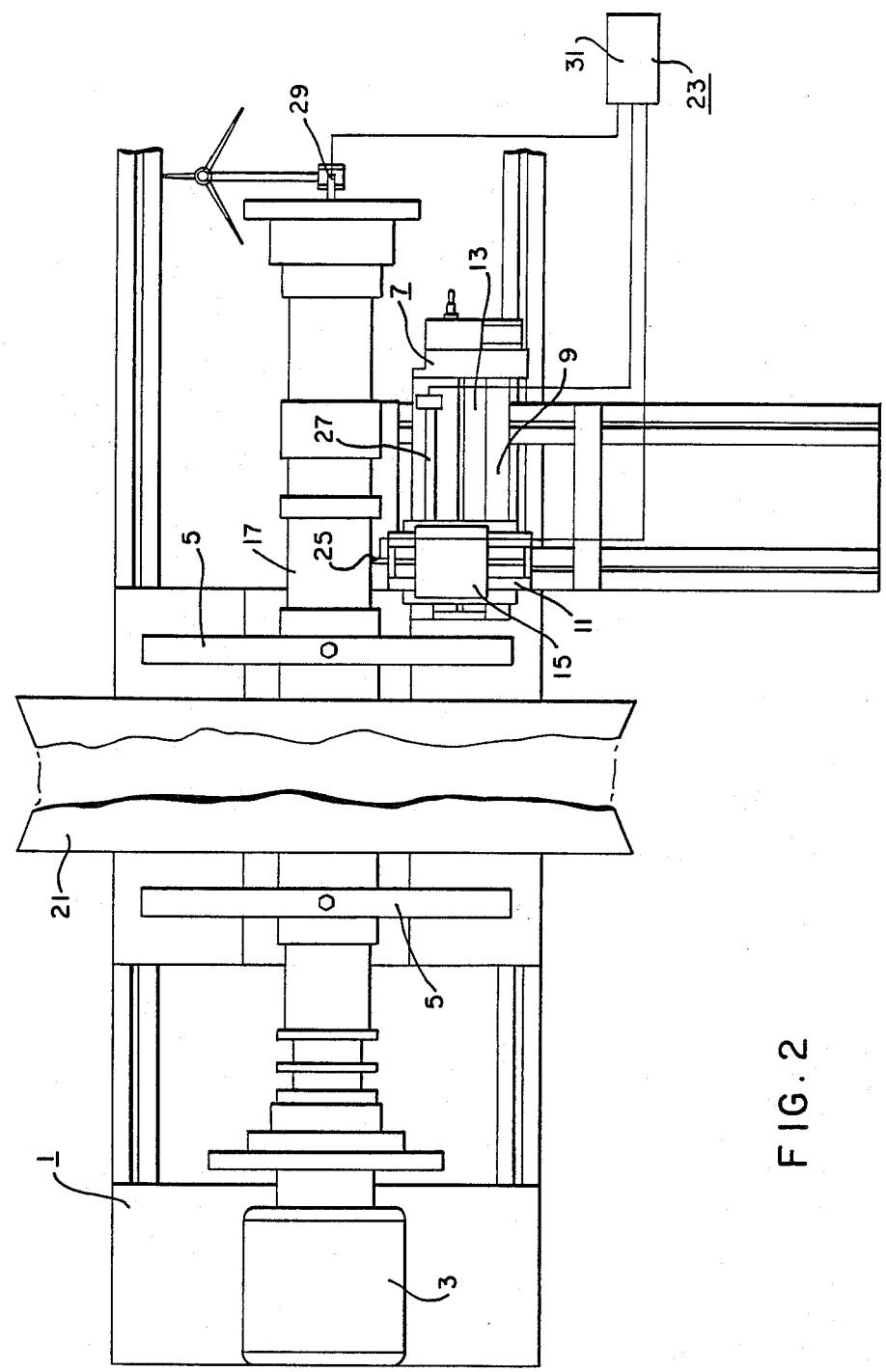
FIG. 2 is a plan view of the apparatus.
Figure 3:
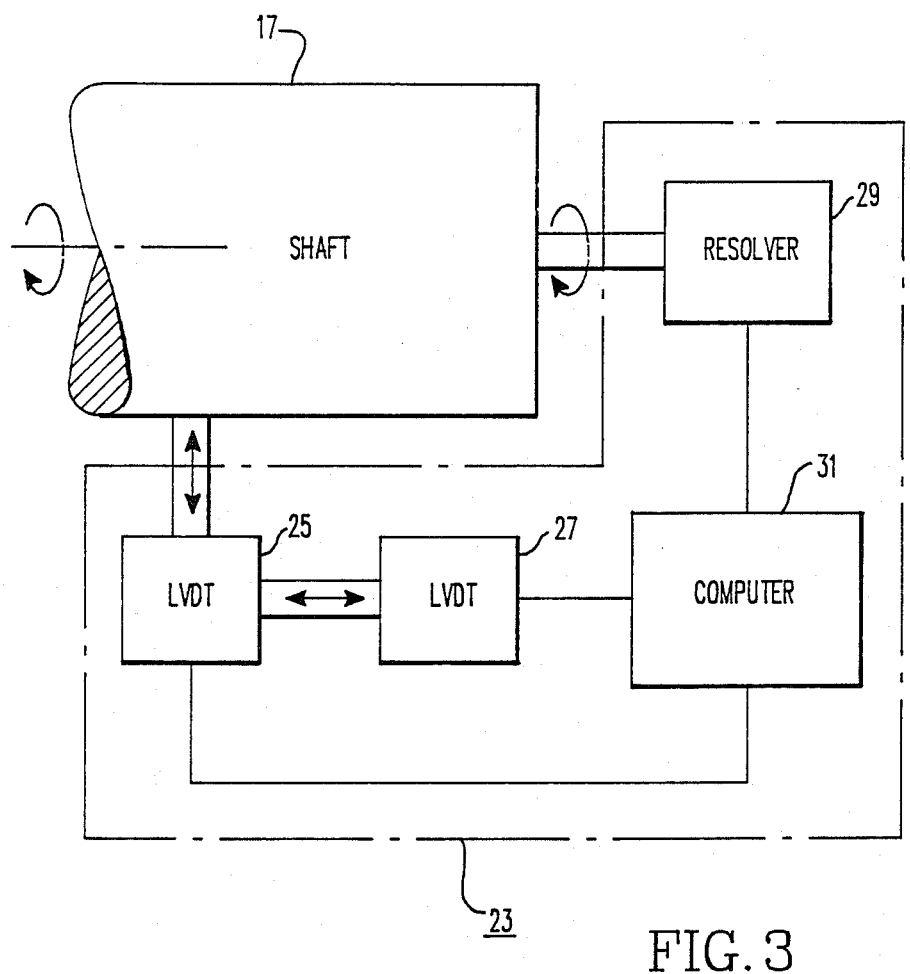
FIG. 3 is a schematic diagram of the apparatus.

Referring now to the drawings in detail, there is shown a large lathe 1 having a headstock 3, a pair of steady rests or bearing supports 5 and a carriage 7 having a crossfeed 9 with a compound head 11, which has a first tool feed portion 13 oriented parallel to the axis of the lathe and a second tool feed portion 15 oriented normal or perpendicular to the axis of the lathe 1. No tailstock is shown as it is not utilized with very large shafts 17 such as that of a steam turbine rotor 21, however, when checking the runout of smaller shafts, it may be desirble to utilize the tailstock.

Rotatably mounted in the lathe 1 is the low pressure steam turbine rotor 21, the shaft 17 of which is to be checked for runout by apparatus 23 which provides an intelligible representation of the runout in the form of data which is either in visible form or stored on tape or disks and is machine readable. The data may appear on a cathode ray tube, a CRT screen in the form of tables of numerical data, graphs or charts, or may be in printed form as is normally produced by a personal computer with auxiliary equipment such as disk or tape drives, printers or other recording means. The apparatus 23 also comprises a first probe or linear variable differential transformer, LVDT 25 disposed on the second tool feed portion 15 of the compound crossfeed and cooperates therewith to provide means for producing a signal proportional to the deviation of the outer periphery of the shaft 17 with respect to a true circle when the shaft 17 is rotated, a second probe or linear variable differential transformer LVDT 27 connected to the first portion of the tool feed 13 of the compound head 11 which is oriented axially and cooperates therewith to provide means for producing a signal indicative of the axial position of the deviation signal means 25 and a third probe, a resolver, or shaft position encoder 29 or other means for providing a signal indicative of the angular position of the shaft with respect to some reference on the shaft such as a mark, a keyway or a balance hole or some other physical characteristic which can be easily identified. The apparatus 23 also comprises means for combining the informational content of the signals such as a personal computer 31 to form an intelligible representation of the runout of a portion of the shaft 17 in the form numerical tables of a runout in thousandths of an inch at various angular shaft positions, a graph or curve of the deviation either on a CRT screen or printed on paper or the information could be recorded on a magnetic tape or disk or other recording means for future visual presentation by the personal computer 31 or a computer located elsewhere.

To provide the intelligible representation of a shaft 17 or the deviation of the peripheral surface from that of a true circle. The shaft 17 is rotatably mounted to rotate about its axis. The first probe 25 is moved by the compound head 11 to engage the shaft 17 in such a manner that it is in its mid range and then it is calibrated. The axial position of the first probe 25 is noted with respect to some distinguishing feature on the shaft 17 and related to the axial position indicated by the second probe 27. The third probe is attached to the shaft 17 preferably but not necessarily the end of the shaft 17 to provide an indication of the angular position of the shaft 17. The lathe 1 is operated rotating the shaft 17 at a low speed. The signals from the first and second probe 25, 27 and the resolver 29 are fed to the computer 31 wherein the informational content of the signals are combined to produce an intelligible representation of the runout of the shaft 17 at the axial location of the first probe, the first portion 13 of the compound head is then operated moving the first probe 25 axially, the informational content of the signals of the first and second probes 25, 27 and resolver 29 are combined by the computer 31 to produce an intelligible representation of the runout of the shaft 17 at the new location of the first probe 25 thus, a representation of the runout is produced at several locations to provide a comprehensive indication of the deviation of the periphery of the shaft 17 with respect to a true circular periphery is obtained. Thus providing visual representation of the data in the form of numerical table, graphs, or curves to an operator and providing the information in a form which can be readily transmitted via telephone lines to others at any distance from the site.

What is claimed is:

1. A method for providing intelligible representation of the runout of a portion of a shaft comprising the steps of:

supporting the shaft so that it rotates about its central axis;

rotating the shaft about its central axis;

contacting said portion of said shaft with means for providing a signal proportional to the linear deviation of the shaft with respect to a true circle as the shaft rotates;

producing a signal indicative of the angular position of said shaft with respect to a reference mask on said shaft; and combining the informational content of said linear deviation and angular positions signals to form an intelligible representation of the runout of said portion of said shaft.

2. The method as set forth in claim 1 and further comprising the step of producing a linear deviation signal indicative of the axial position of said means for producing a linear deviation of the shaft signal relative to an axial reference on said shaft; and moving said means for producing a signal proportional to the linear deviation of said shaft to incremental axial positions and combining the informational content of said signals at each of said axial positions to form an intelligible representation of the runout of said shaft over an extended portion thereof.

* * * * *